L. W. DOWNES & A. W. FAXON.
MAGNETIC CHUCK.
APPLICATION FILED MAR. 7, 1913.
1,079,546.
Patented Nov. 25, 1913.
2 SHEETS—SHEET 1.
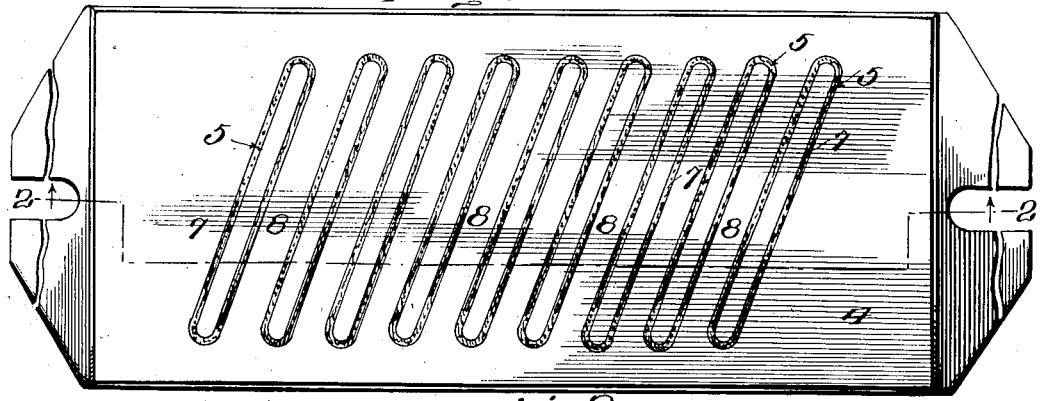
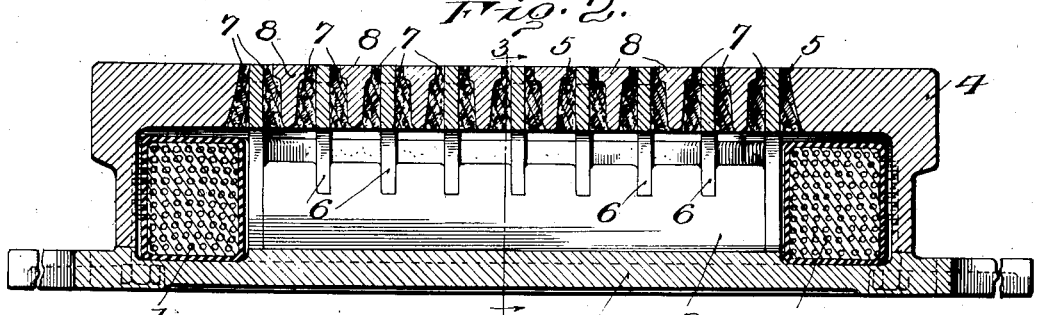
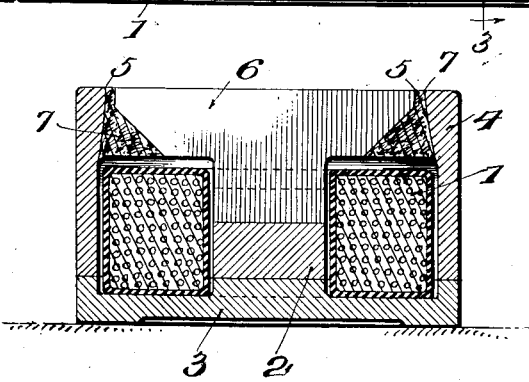

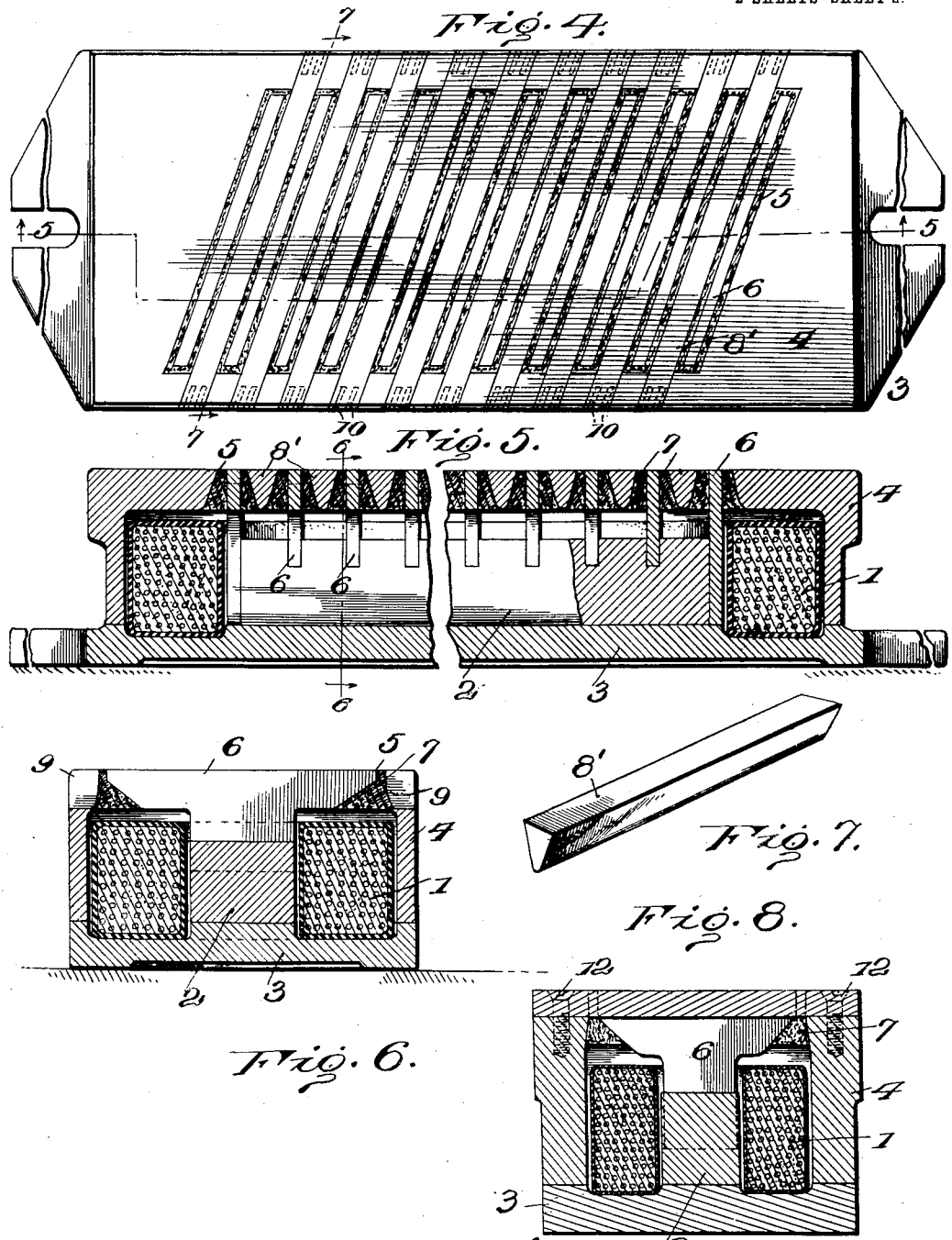

UNITED STATES PATENT OFFICE.

LOUIS W. DOWNES AND ALFRED W. FAXON, OF PROVIDENCE, RHODE ISLAND; SAID FAXON ASSIGNOR TO D. & W. FUSE CO., OF PROVIDENCE, RHODE ISLAND, A CORPORATION OF RHODE ISLAND.

MAGNETIC CHUCK.

1,079,546.   Specification of Letters Patent.   Patented Nov. 25, 1913.

Application filed March 7, 1913. Serial No. 752,862.

*To all whom it may concern:*

Be it known that we, LOUIS W. DOWNES and ALFRED W. FAXON, of Providence, Rhode Island, have invented a new and useful Improvement in Magnetic Chucks, which invention is fully set forth in the following specification.

This invention relates to magnetic chucks having the pole pieces so shaped or subdivided that the surface of the chuck is traversed by a great aggregate length of polar gap so that many small pieces of material may be acted upon at the same time, and yet is equally good for large pieces.

Our object is to produce a chuck which has a much greater subdivision of holding surface than has been heretofore practicable without serious loss of holding capacity, so that very small pieces of work placed on the chuck at random will bridge the magnetic gaps without necessitating a subsequent act of the operator to arrange the pieces in proper working positions over the gaps, so that the chuck can be economically used for much smaller pieces of work than heretofore, and nevertheless will have increased holding power without increased expenditure of electrical energy.

Other objects of the invention are to construct the poles in such manner that the pole extension pieces may properly register in the openings in the pole plate of opposite polarity without requiring grinding or further shaping the parts to secure this result as is usually the case when the pole extensions are made of cast iron; also to render the chuck face more rigid and less apt to leak at the joints by providing a more intimate union of the non-magnetic material with the metal of the poles than heretofore attained.

Magnetic chucks are peculiarly adapted for holding down thin flat iron or steel pieces undergoing machining operations, but when the pieces to be operated on present very small areas, it is found that only those pieces which happen to bridge non-magnetic gaps are held in working position while those not so fortunately positioned would slide over the polar surfaces unless they be properly positioned, an operation, which consumes time of an operator and prejudices the use of the chuck. Magnetic chucks of this class have been usually made with multiple pole pieces of cast iron integral with or secured to a core of like material which may form a base for the chuck and to which the casing having openings for receiving the pole pieces is secured. Cast iron pole faces cannot be reduced in width to any great extent without seriously reducing the holding power of the chuck, even if the electric power used is increased, due to the fact that any material reduction in the cross section or width of face of the pole, materially increases the reluctance of that portion of the magnetic circuit, and thus seriously reduces the total flux, and consequently the holding power of the chuck. Cast metal poles present a further disadvantage in that they not infrequently contain blow holes or porous spots which materially increase the magnetic reluctance of the circuit, thereby rendering the holding faces of such poles either inoperative or materially reducing their holding efficiency when the coil of the chuck is energized. Such defects in cast metal also tend to increase the leakage of magnetic lines of force across the air gaps below the holding surfaces much to the detriment of the holding power of the chuck. Multiple cast metal poles also present difficulties when they are assembled. In casting the polar extensions, they do not always retain parallelism when the casting cools and therefore do not properly register in the openings in the companion pole plate when the non-magnetic metal is to be poured in to fill the air gaps. Machining of these cast metal parts is then required to cure the defects and thus adds to the cost of manufacture.

Our invention overcomes the above objections in whole or very large measure and secures the objects above described by providing a magnetic chuck in which the reluctance of one set of poles is materially reduced, thereby enabling the cross-section of these pole elements, or, in other words, the width of these pole faces to be reduced, and the number of such elements for a given area of holding face of the chuck and also the air gap below the holding surface to be increased. We accomplish these results by constructing the polar elements of metal of high magnetic permeability such as wrought iron or mild steel either of which possesses permeability about twice as great as cast iron at the degree of saturation generally used. This permits the reduction in section, and consequently the width of pole face to as little as one-half that of a cast iron pole without increasing the reluctance at this portion of the magnetic circuit so that with any given magnetizing force the holding power for a given piece is practically as great as with a cast iron pole of twice the width.

While cast steel is a metal possessing a high permeability, we find it unsuited for constructing magnetic chucks in accordance with our invention for the reasons that mild steel castings invariably come very rough and require a considerable amount of machining or dressing in order to bring them down to any given dimensions. This adds very seriously to the cost of construction. They are furthermore frequently full of flaws and blow holes which interpose such a high reluctance in the magnetic path as to effectually overcome the high permeability of the steel.

The material which we have found most effective in constructing our improved magnetic chucks and the material which we prefer and do use is the ordinary mild steel, generally known in the trade as machinery steel rolled in bars to some satisfactory shape. This material is free from the defects described above and possesses a high magnetic permeability and can be cut into lengths and shaped at low cost.

The companion pole plate which contains the openings or slots for receiving the pole extensions may be made in various ways. Owing to the reduction in width of the pole face, due to the use of steel, the companion pole plate may be made of cast iron and its cross members which constitute the return magnetic paths between the pole pieces may be increased in cross-section, thereby reducing the reluctance of this part of the magnetic path and increasing the holding qualities of the chuck while retaining in the construction the use of this cheaper metal. If, however, it is desired to produce a chuck of exceptionally high holding power, the cross members may be of machinery steel bars adapted to be inserted in a cast iron frame and secured thereon or the frame may be cast about the bars or the companion pole may be made of mild steel in form of a separate plate.

In order to secure exceptionally great rigidity and tightness at the joint between the non-magnetic filling metal and either pole, we may, and preferably do, tin the cross bars, steel insert pieces, or the steel surface plate according to the construction used, thereby enabling the non-magnetic metal such as solder or the like when poured in to fill the air gaps to make a close and intimate union with the magnetic metal.

The construction of the poles of the holding face of steel or like material of low reluctance and in the manner described enables the number of holding points to be increased while permitting the advantages to be retained of making the core and casing of cast iron, a metal which is cheap and readily cast into the forms suitable for these parts. Furthermore, a more uniform holding surface is secured by the use of steel poles for the reason that steel, particularly in the form of rolled plates, enables the poles to be made in standard sizes of uniform permeability to the magnetic lines of force thereby uniformly distributing the magnetic force over the face of the chuck. Steel poles also lessen the leakage of lines of force where it is necessary to have air or non-magnetic gaps. Owing to the smaller size of pole necessary, a greater length of gap below the holding surface is possible. A very slight increase in gap length at these points materially reduces the leakage owing to the enormously high reluctance of an air path.

In order that the invention may be more readily understood, reference will be made to the accompanying drawings illustrating some of the mechanical embodiments of the inventive idea, but such drawings are intended only as illustrations to assist the description and not as defining the limits of the invention.

In the drawings—Figure 1 is a plan view and Fig. 2 is a vertical longitudinal sectional view on line 2—2 of Fig. 1, showing a chuck embodying our improvements. Fig. 3 is a cross sectional view on the line 3—3, Fig. 2, showing details of construction. Fig. 4 is a plan view and Fig. 5 is a broken sectional view, somewhat enlarged, on line 5—5 of Fig. 4, showing another embodiment of our improvement. Fig. 6 is a detail sectional view on line 6—6, Fig. 5 and Fig. 7 is a perspective detail view of a bar. Fig. 8 is a transverse vertical sectional view of a chuck showing a modified construction of the pole plate.

Referring to the drawings, there is shown in Figs. 1, 2 and 3 a magnetic chuck comprising a magnetizing coil 1, preferably the replaceable covered type, within which is a cast iron core 2 formed integral with or separable from the base 3 of the same metal, a casing 4 also of cast iron provided with elongated slots 5 arranged at an acute angle to the sides of the casing which incloses the coil and is magnetically connected through the base 3 with the lower end of the magnet 13 core 2. In the upper end of the cast iron core are located a plurality of steel pole extension plates 6. These plates are preferably stamped from sheet metal and in standard sizes and T-shaped, though they may be made of other kinds of metal having high permeability to magnetic lines of force and they may assume other forms than that specifically illustrated. The pole extensions 6 are secured to the end of the core casting and in any desired manner, but preferably they are either forced into openings sunk into the casting or they may be placed in a mold and cast iron poured around their ends. Should the pole plates not properly register with the elongated openings 5 provided in the top wall of the casing 4 of the chuck, they are readily bent into proper alinement and without requiring machining of the parts, to adapt them to project into the elongated slots 5 in the face of the chuck, and leave narrow air gaps to be afterward filled with non-magnetic material such as solder 7. But before such material is introduced the faces of the poles are preferably tinned whereby the non-magnetic filling material may alloy therewith, and securely hold the parts together and be itself securely held in place. Greater rigidity is thus attained and the joints are made water-tight. The ends of the T-shaped pole extension pieces are preferably beveled at their lower corners as shown in Fig. 3, with a view of reducing the leakage of lines of force at these points through the non-magnetic gap to the casing 4. For a similar reason the cross bars 8 which constitute a return path to the lower end of core 2 through the casing 4 are cut away or tapered on their lower side to diminish leakage and waste of force through the non-magnetic material filling the air gaps.

The above described construction enables the number of pole pieces and consequently the number of air or non-magnetic gaps on the face of the chuck to be materially increased and their width decreased without decreasing the holding power of the chuck while enabling very small pieces of work to be thrown at random on the face of the chuck and bridge the gap, a condition essential for holding the pieces firmly on the energized face. It is thus possible to reduce the cross-section of the pole pieces one-half the ordinary sizes and still get the same flux through the pole pieces for a given magnetic force and a given reluctance of the magnetic circuit.

In the form of chuck, above described, the cross bars 8 which are of a polarity opposite that of the core extension pieces are made of cast iron. They may be, however, and preferably are made of steel or iron of high magnetic permeability in which event they are made separate and it is advantageous to make them in standard sizes by shaping them from bars of steel or like metal of high and uniform permeability. In Figs. 4 to 7, we have illustrated such a construction of chuck in which the core 2 and steel pole extension pieces are constructed in the manner described in connection with the illustration in Figs. 1 to 3. The bars 8' are preferably of triangular cross-section to reduce leakage across the non-magnetic gaps below the face of the chuck and are adapted to fit into recesses 9 in the top of the casing wall 4 and to be secured therein by dowel pins 10 or other fastening means.

The use of steel bars for the return path to the casing with steel pole extension pieces enables the surface of each bar to be reduced about one-half, thereby permitting a further increase of the number of pole faces on the chuck without reducing the holding power of the face. This form of chuck is peculiarly fitted for holding a large number of very small pieces of work both because of the multiplicity of narrow gaps which the pieces are permitted to bridge and also because the lines of force are very uniformly distributed over the face when the chuck is energized.

By making the cross-bars of steel and a little more than half the size of bars of cast iron, the holding power may be increased, since we are enabled to reduce the reluctance of the circuit at this most important point. The surfaces of the bars and of the pole extension pieces are preferably tinned where they are to retain the non-magnetic material. This insures a very rigid structure and ties the bars against any possibility of displacement.

By reason of our improved construction of magnetic chuck, we are enabled to produce a chuck of greater holding power than any cast iron chuck of similar dimensions for any given number of ampere turns, owing to the great saving in the size of poles. It is also possible, we find, to make the pole pieces a little greater than half the section of the old cast iron pole pieces and to make the cross bars or members of cast iron of somewhat greater cross-section than heretofore and thereby materially increase the holding power for a given magnetizing force.

In Fig. 8 is illustrated a magnetic chuck constructed in all respects like that shown in Figs. 1 to 3 except that the chuck is provided with a separable top polar plate 11 of machinery steel. This plate is preferably made from ⅜ inch material in which are punched by a powerful press elongated openings to receive the polar extensions and is secured to the casing by means of screws 12. Preferably the junction with the casing is rendered watertight by any suitable means. This construction makes it possible to increase the number and bring the polar projections very close together because of the high permeability of the metal used.

To avoid unnecessary illustration, electric connections and switches usually associated with such chucks have been omitted as they form no part of the present invention.

The term "mild steel" used in the claims is intended to include such equivalent materials as wrought iron and other varieties of iron having high permeability and homogeneous texture as distinguished from cast iron having low permeability and from cast steel which possesses high permeability but lacks homogeneous texture.

What we claim is—

1. A magnetic chuck suitable for holding small articles having its holding surface composed of interlocking narrow pole pieces and non-magnetic material filling narrow polar gaps between them, the pole pieces of at least one polarity being composed of mild steel and all the pole pieces being magnetically connected with a core of magnetic material other than mild steel surrounded by a magnetizing coil.

2. A magnetic chuck suitable for holding small articles having its holding surface composed of interlocking narrow pole pieces and non-magnetic material filling narrow polar gaps between them, the pole pieces of at least one polarity being composed of mild steel and all the pole pieces being magnetically connected with a core of magnetic material surrounded by a magnetizing coil, said pole pieces being cut away relatively to each other below their surface to decrease the magnetic leakage across the gap.

3. In a magnetic chuck, the combination of a magnetizing coil, a cast iron core for the same provided with mild steel pole projections and a casing having one wall provided with openings for receiving said steel projections and magnetically connected with the opposite end of said core.

4. In a magnetic chuck, the combination of a magnetizing coil, a cast iron core for the same, mild steel pole plates inserted in said core and a work holding surface or plate having elongated openings registering with said steel poles and magnetically connected with the opposite end of said core, the connecting webs of the plate being tapered for the purpose described.

5. A magnetic chuck having a work holding face which comprises a plurality of bars of highly permeable magnetic metal spaced apart and supported by the walls of the casing of different magnetic metal to form a grid, pole extension pieces terminating within the spaces of the grid and non-magnetic material between said pole pieces and bars.

6. A magnetic chuck having a work holding face which comprises a plurality of bars of mild steel with tapered lower sides and supported by the walls of the casing and forming a grid, pole extension pieces terminating within the spaces of the grid and non-magnetic material between said pole pieces and bars.

7. A magnetic chuck having poles provided with a tin coating and non-magnetic material between said poles and cemented thereto by said tin coating.

8. A magnetic chuck having a core of cast iron cast integral with a plurality of pole pieces of narrow plates of mild steel extending parallel to each other from said core to and forming a part of the holding surface of said chuck and a set of pole pieces of the opposite polarity, of magnetic material, connected magnetically with said core, arranged alternately with and close to said mild steel pole pieces and a non-magnetic filling material filling the polar gap between said sets of pole pieces so as to form a chuck having a holding surface traversed by a narrow polar gap of great aggregate length so that every part of the holding surface is close to a polar gap.

9. A magnetic chuck having a core of cast iron cast integral with a plurality of pole pieces of narrow plates of mild steel extending parallel to each other from said core to and forming a part of the holding surface of said chuck and a set of pole pieces of the opposite polarity, of magnetic material, connected magnetically with said core, arranged alternately with and close to said mild steel pole pieces and a non-magnetic filling material filling the polar gap between said sets of pole pieces so as to form a chuck having a holding surface traversed by a narrow polar gap of great aggregate length so that every part of the holding surface is close to a polar gap, and a portion of said pole pieces below the surface of the chuck cut away relatively to each other to increase the polar gap at that point and decrease the leakage across the gap below the surface of said chuck.

10. In a magnetic chuck, the combination of a magnetizing coil, a cast iron core for the same provided with mild steel pole projections and a mild steel pole plate provided with openings for receiving said projections and magnetically connected with the opposite end of said core.

11. In a magnetic chuck, the combination of a magnetizing coil, a cast iron core for the same provided with mild steel pole projections, and a pole plate magnetically connected with the core provided with openings for receiving said projections and having a mild steel face.

12. In a magnetic chuck, the combination of a magnetizing coil, a cast iron core having pole projections, and a pole plate having openings for receiving said projections and magnetically connected with said core, the faces of the pole projections, or the face of the pole plate, or both, being of mild steel.

13. A magnetic chuck having polar faces of opposite polarity, a portion of the area of said faces being of mild steel supported by a different magnetic metal.

In testimony whereof we have signed this specification in the presence of two subscribing witnesses.

LOUIS W. DOWNES.
ALFRED W. FAXON.

Witnesses:
K. E. GREENE,
GEORGE W. STEERE.